United States Patent
Takahashi et al.

(10) Patent No.: US 7,931,316 B2
(45) Date of Patent: Apr. 26, 2011

(54) VEHICLE BUMPER STRUCTURE

(75) Inventors: Hiroyuki Takahashi, Aichi-ken (JP); Ryotaro Kachu, Aichi-ken (JP); Tetsuya Takafuji, Anjyo (JP); Yoji Kobayashi, Hitachi (JP)

(73) Assignees: Toyota Jidosha Kabushiki Kaisha, Toyota-shi, Aichi-ken (JP); Denso Corporation, Kariya, Aichi-Pref (JP)

( * ) Notice: Subject to any disclaimer, the term of this patent is extended or adjusted under 35 U.S.C. 154(b) by 11 days.

(21) Appl. No.: 12/279,361

(22) PCT Filed: Feb. 14, 2007

(86) PCT No.: PCT/IB2007/000355
§ 371 (c)(1),
(2), (4) Date: Jun. 15, 2009

(87) PCT Pub. No.: WO2007/093898
PCT Pub. Date: Aug. 23, 2007

(65) Prior Publication Data
US 2010/0038922 A1     Feb. 18, 2010

(30) Foreign Application Priority Data
Feb. 15, 2006   (JP) .................................. 2006-038439

(51) Int. Cl.
*B60R 19/48* (2006.01)
(52) U.S. Cl. ..................... 293/117; 296/187.09; 180/274
(58) Field of Classification Search .................. 293/102, 293/117, 133; 296/187.09, 187.04; 73/800; 180/274; 280/735
See application file for complete search history.

(56) References Cited

U.S. PATENT DOCUMENTS

| | | | |
|---|---|---|---|
| 7,364,222 B2 * | 4/2008 | Tanabe | 296/187.03 |
| 2005/0200139 A1 * | 9/2005 | Suzuki | 293/117 |
| 2006/0091299 A1 * | 5/2006 | Inamoto et al. | 250/221 |
| 2008/0203742 A1 * | 8/2008 | Takahashi | 293/117 |

FOREIGN PATENT DOCUMENTS

DE        103 40 263 A1     4/2005
(Continued)

OTHER PUBLICATIONS

Japanese Office Action dated May 19, 2009.

*Primary Examiner* — Joseph D Pape
(74) *Attorney, Agent, or Firm* — Finnegan, Henderson, Farabow, Garrett & Dunner, LLP

(57) ABSTRACT

In a vehicle bumper structure, an optical fiber sensor (32) is provided on the upper portion of the front surface of a front wall portion (30A) of a front-bumper reinforcement (30). A front-bumper absorber (28) is provided before the optical fiber sensor (32) and a load transfer plate (34) is disposed between the front-bumper absorber (28) and the optical fiber sensor (32). The vertical width (B3) of the front-bumper absorber (28) and the load transfer plate (34) are greater than the vertical width (B1) of the optical fiber sensor (32), and a lower end portion (34A) of the load transfer plate (34) extends below the lower end of the optical fiber sensor (32). Accordingly, when the optical fiber sensor (32) is offset to the upper portion of the front-bumper reinforcement (30), the front-bumper absorber (28) will not topple down and the impact load is input to the optical fiber sensor (32) even if the input direction of the impact load is slightly inclined.

16 Claims, 10 Drawing Sheets

FOREIGN PATENT DOCUMENTS

| | | |
|---|---|---|
| DE | 10 2005 051 095 A1 | 5/2006 |
| EP | 1 574 399 A1 | 9/2005 |
| EP | 1 717 109 A1 | 11/2006 |
| EP | 1 792 791 A1 | 6/2007 |
| JP | 54 174147 | 5/1953 |
| JP | 2000-225907 | 8/2000 |
| JP | 2005-178416 | 7/2005 |
| JP | 2005 186676 A | 7/2005 |
| JP | 2005-186677 | 7/2005 |
| JP | 2005-254922 | 9/2005 |
| JP | 2005 263038 A | 9/2005 |
| WO | WO 2005/061284 A1 | 7/2005 |
| WO | WO 2005/115802 A1 | 12/2005 |
| WO | WO 2006/046771 A1 | 5/2006 |
| WO | WO 2006/123236 A1 | 11/2006 |

* cited by examiner

VEHICLE BUMPER STRUCTURE

CROSS-REFERENCE TO RELATED APPLICATIONS

This application is a national phase application of International Application No. PCT/IB2007/000355, filed Feb. 14, 2007, and claims the priority of Japanese Application No. 2006-038439, filed Feb. 15, 2006, the contents of both of which are incorporated herein by reference.

BACKGROUND OF THE INVENTION

1. Field of the Invention

The present invention relates to a vehicle bumper structure that detects a collision with an object such as a pedestrian or the like.

2. Description of the Related Art

Japanese Patent Application Publication No. 2000-225907 (JP-A-2000-225907) describes an arrangement in which a load sensor is provided for detecting a frontal collision of a vehicle with an object, e.g., a pedestrian. Specifically, a groove extending in the vehicle width direction is formed in the front surface of a front-bumper reinforcement, and an elongated load sensor is received in the groove flush with the front surface. In the back surface of a front-bumper absorber, a pair of upper and lower grooves extending in the vehicle width direction is formed. A protruding portion (or a push portion) provided between the upper and the lower groove is disposed to correspond to the load sensor.

The structure described in JP-A-2000-225907, however, leaves a room for improvement in the following respects. In particular, if the height of the load sensor is reduced and the front-bumper absorber is configured to have a low height in consideration of the kind of a vehicle or in terms of vehicle weight reduction, the front-bumper absorber may topple down toward the front surface of the front-bumper reinforcement (toward a side opposite to the load sensor in the vehicle height direction) depending on an impact direction, which causes a possibility that the impact load is not sufficiently transferred to the load sensor.

In an effort to prevent the front-bumper absorber from toppling down, the front-bumper absorber may be further extended up to a portion where there is no load sensor. In this case, however, the impact load is partly transferred to the front-bumper reinforcement through the extension portion, so that the impact load input to the load sensor is reduced in proportion thereto. This solution is therefore undesirable.

SUMMARY OF THE INVENTION

The present invention provides a vehicle bumper structure that accurately transfers an impact load applied to a bumper shock-absorbing member to a load-sensing unit even when the load-sensing unit is installed at a part of an outside surface of a bumper reinforcing member.

In accordance with an first aspect of the present invention, there is provided a vehicle bumper structure including: a bumper cover arranged at an outermost side of a vehicle and extending in a vehicle width direction; a bumper reinforcing member disposed spaced apart from the bumper cover toward the inside of the vehicle, the bumper reinforcing member extending in the vehicle width direction; a load sensing unit arranged on the vehicular outside surface of the bumper reinforcing member facing the bumper cover, the load sensing unit extending in a lengthwise direction of the bumper reinforcing member and having a vertical smaller than the vertical width of the bumper reinforcing member; a bumper shock-absorbing member arranged between the bumper cover and the bumper reinforcing member and extending in the vehicle width direction, the bumper shock-absorbing member having a vertical width greater than that of the load sensing unit; and a load transfer member, provided between a load sensing portion of the load-sensing unit and the bumper shock-absorbing member, that transfers the load input to the bumper shock-absorbing member to the load-sensing unit. There is a gap between the load transfer member and the vehicular outside surface of the bumper reinforcement member. The load transfer member has a vertical width greater than that of the load-sensing unit.

In accordance with such arrangements, when the vehicle bumper structure collides with an object such as a pedestrian or the like, the impact load is first inputted to the bumper cover arranged on the outermost side of the vehicle. The impact load is transferred to the bumper shock-absorbing member arranged inside the bumper cover so that the bumper shock-absorbing member absorbs shock or energy of the impact load. The impact load from the bumper shock-absorbing member is in turn transferred to the load transfer member and then transferred from the load transfer member to the load-sensing unit. Thus, the load-sensing unit detects the collision with the object.

The vertical width of the load-sensing unit is set to be smaller than the vertical width of the bumper reinforcement member. In other words, the load-sensing unit has a smaller size in the vehicle height direction than the bumper reinforcement member. If the vertical width of the bumper shock-absorbing member is made equal to the vertical width of the load-sensing unit, there exists a possibility that, when the input direction of the impact load is slightly inclined upwardly or downwardly with respect to the vehicle longitudinal direction (more precisely, in the direction running from the front to the rear of the vehicle), the bumper shock-absorbing member may topple down toward an opposite side to the load-sensing unit of the bumper reinforcing member. This makes it difficult for the load-sensing unit to sense the impact load.

In the first aspect, however, because the vertical width of the load transfer member (and the bumper shock-absorbing member) is set to be greater than that of the load-sensing unit, the impact load is input to the load-sensing unit through the load transfer member, even when the input direction of the impact load is slightly inclined upwardly or downwardly with respect to the vehicle longitudinal direction. Furthermore, because there is a gap between the load transfer member and the vehicular outside surface of the bumper reinforcement member (namely, owing to the non-contact arrangement thereof), the load transfer member does not contact the vehicular outside surface of the bumper reinforcement member, which would otherwise lead to dispersion and loss of the impact load to be transferred. The impact load applied to the bumper shock-absorbing member can be transferred to the load-sensing unit with a high accuracy, even in a case where the load-sensing unit is installed on a part of the vehicular outside surface of the bumper reinforcement member.

In the first aspect of the present invention, the load-sensing unit may be offset to the upper portion of the vehicular outside surface of the bumper reinforcing member, and the load transfer member and the bumper shock-absorbing member may extend below the lower end of the load-sensing unit.

Alternatively, in the first aspect of the present invention, the load-sensing unit may be offset to the lower portion of the vehicular outside surface of the bumper reinforcing member, and the load transfer member and the bumper shock-absorbing member may extend above the upper end of the load-sensing unit.

Further, in the first aspect of the present invention, the load-sensing unit may be arranged at a central portion of the vehicular outside surface of the bumper reinforcement member, and the load transfer member and the bumper shock-absorbing member may extend upwardly and/or downwardly beyond at least one of the upper end and the lower end of the load-sensing unit.

In accordance with the arrangements described above, it is possible to select optimal arrangements of the load transfer member and the bumper shock-absorbing member depending on the position of the load-sensing unit on the vehicular outside surface of the bumper reinforcement member. This makes it possible to design the vehicle bumper structure to make it correspond to various vehicles in consideration of factors of the vehicle bumper such as a ground clearance.

In the first aspect of the present invention, the bumper shock-absorbing member may have a vertical width smaller than that of the bumper reinforcement member In a second aspect of the present invention, if the load-sensing unit is offset to the upper portion or the lower portion of the vehicular outside surface of the bumper reinforcing member, the bumper shock-absorbing member includes a main body portion that contacts the load transfer member and an anti-toppling leg portion of a reduced thickness. The anti-toppling leg portion extends, in a vehicle height direction, toward the vehicular outside surface of the bumper reinforcement member on the side opposite the offset load-sensing unit side. In addition, the anti-toppling leg portion may be adapted to be pressed against the vehicular outside surface of the bumper reinforcement member to support the main body portion of the bumper shock-absorbing member when the load is input to the bumper shock-absorbing member.

With such arrangements described above, when the main body portion of the bumper shock-absorbing member is urged to topple down toward the side vertically opposite the load-sensing unit when the load is input to the bumper shock-absorbing member, the anti-toppling leg portion presses against the vehicular outside surface of the bumper reinforcing member to thereby support the main body portion of the bumper shock-absorbing member. Further, since the anti-toppling leg portion has a reduced thickness, it is possible to minimize the load dispersion that would occur if the anti-toppling leg portion is pressed against the vehicular outside surface of the bumper reinforcing member. Thus, the impact load input to the bumper shock-absorbing member can be sufficiently transferred to the load-sensing unit.

Moreover, the addition of the anti-toppling leg portion provides an advantage in that a user of the vehicle can feel an appropriate level of rigidity when touching the bumper cover.

In the present invention, the anti-toppling leg portion may be configured to remain pressed against the vehicular outside surface of the bumper reinforcing member to support the main body portion of the bumper shock-absorbing member if the load input in a compressing direction of the anti-toppling leg portion is smaller than a predetermined value, but to loose a support function of supporting the main body portion of the bumper shock-absorbing member if the load input in the compressing direction is equal to or greater than the predetermined value.

With such arrangements described above, the load is applied to the bumper shock-absorbing member in the compressing direction when the vehicle collides with an object. The anti-toppling leg portion remains pressed against the vehicular outside surface of the bumper reinforcement member to support the main body portion of the bumper shock-absorbing member if the load input in the compressing direction is smaller than the predetermined value. This suppresses any toppling down of the main body portion of the bumper shock-absorbing member, thereby ensuring that the impact load is properly input to the load-sensing unit.

On the other hand, if the load input in the compressing direction is equal to or greater than the predetermined value, the anti-toppling leg portion looses its support function of supporting the main body portion of the bumper shock-absorbing member. This makes it possible to minimize the amount of impact load directly transferred from the anti-toppling leg portion to the bumper reinforcement member, thereby minimizing any load dispersion. In proportion thereto, it becomes possible to suppress the reduction in the amount of impact load input to the load-sensing unit. It possible to enhance the reliability with which the impact load is transferred from the bumper shock-absorbing member to the load-sensing unit.

In the second aspect of the present invention, the anti-toppling leg portion may have a weakened portion at which the anti-toppling leg portion buckles if the load input in the compressing direction is equal to or greater than the predetermined value.

With such arrangements described above, the time at which the anti-toppling leg portion ceases supporting the main body portion of the bumper shock-absorbing member can be arbitrarily set by use of the weakened portion. This ensures that the tuning of the support function can be accomplished with ease. The weakened portion can be formed simultaneously with the molding of the bumper shock-absorbing member, thus requiring no additional manufacturing costs thereof.

In the second aspect of the present invention, the anti-toppling leg portion may be inclined downwards toward the rear side of the vehicle and may have a rear end portion that does not contact the vehicular outside surface of the bumper reinforcement member if the load input in the compressing direction is equal to or greater than the predetermined value.

With such arrangements described above, the time at which the anti-toppling leg portion ceases its support function can be arbitrarily set by selecting the inclination angle of the anti-toppling leg portion. This ensures that the tuning of the support function can be accomplished with ease. The anti-toppling leg portion, which extends toward the vehicle-rear side at a predetermined inclination angle, can be formed simultaneously with the molding of the bumper shock-absorbing member, thus requiring no additional manufacturing costs thereof.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

Figure 1:
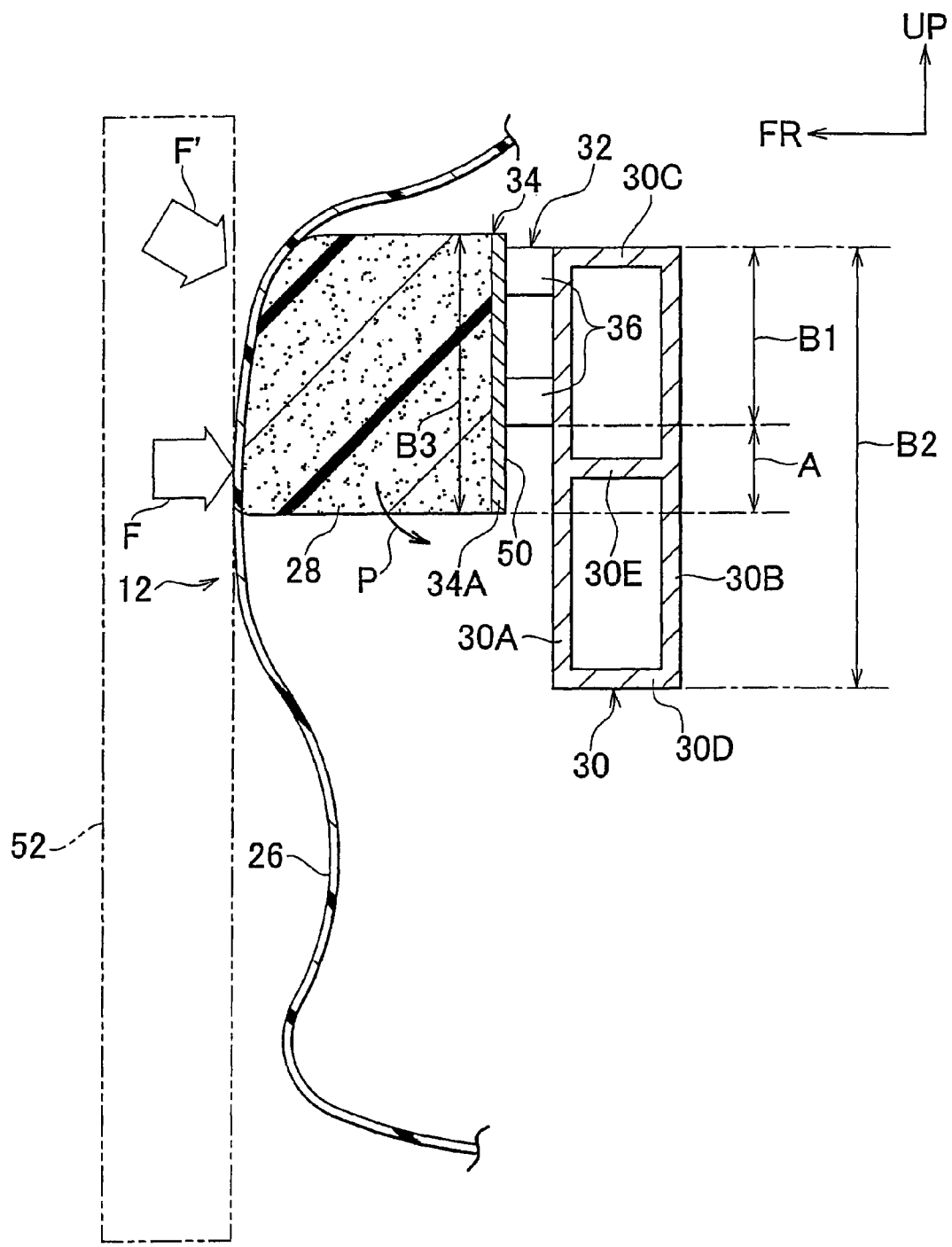
FIG. 1 is an enlarged vertical sectional view (an enlarged sectional view taken along the line 1-1 in shown FIG. 3) showing major parts of a vehicle bumper structure in accordance with a first embodiment of the present invention.

Hereinafter, a vehicle bumper structure in accordance with a first embodiment of the present invention will be described with reference to FIGS. 1 to 5. In the drawings, the arrow FR represents a vehicle front direction, the arrow UP denotes a vehicle height direction, and the arrow IN stands for a vehicle inward width direction.

Figure 2:
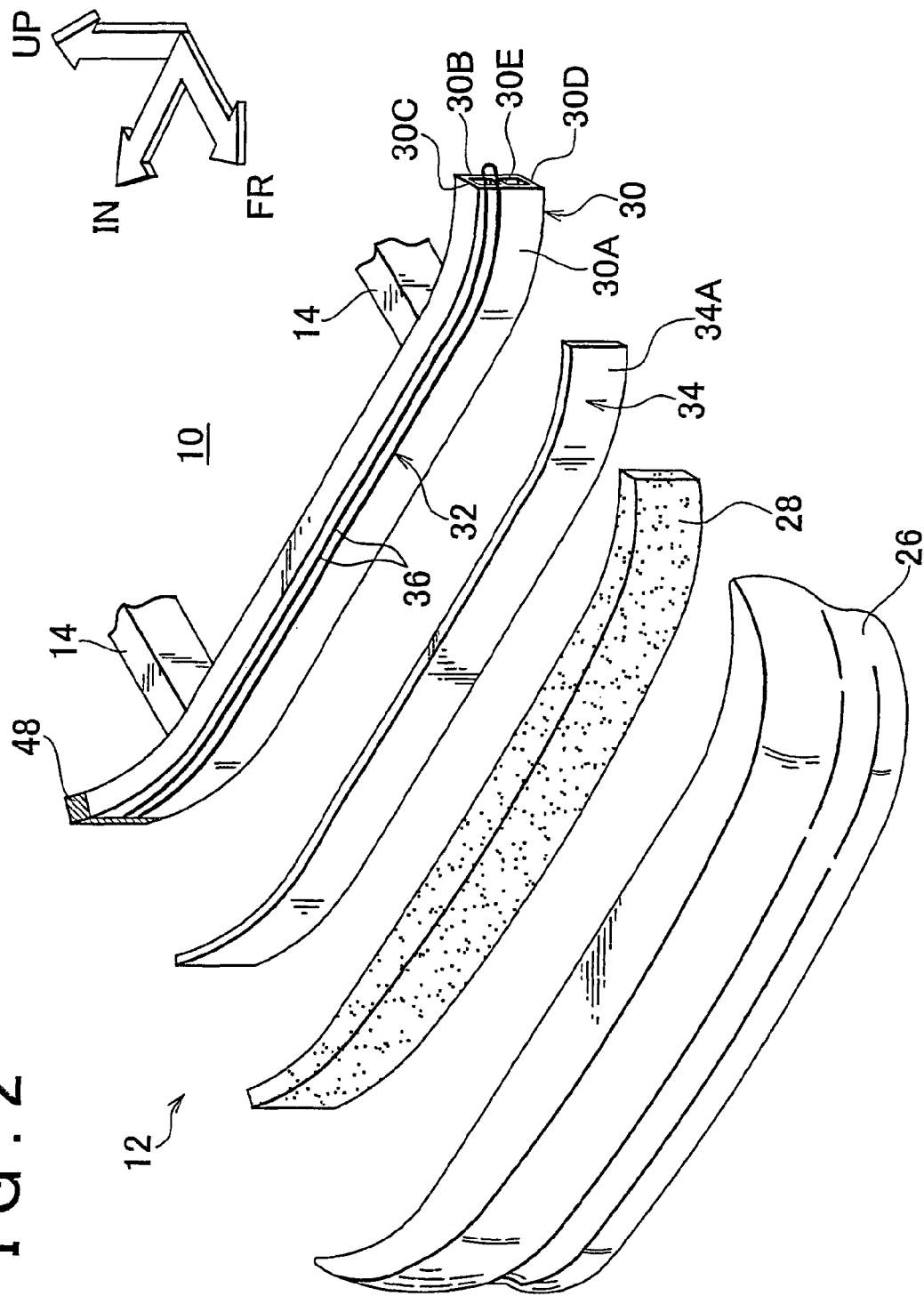
FIG. 2 is an exploded perspective view illustrating a front-bumper of a front vehicle-body section including the vehicle bumper structure shown in FIG. 1.
Figure 3:
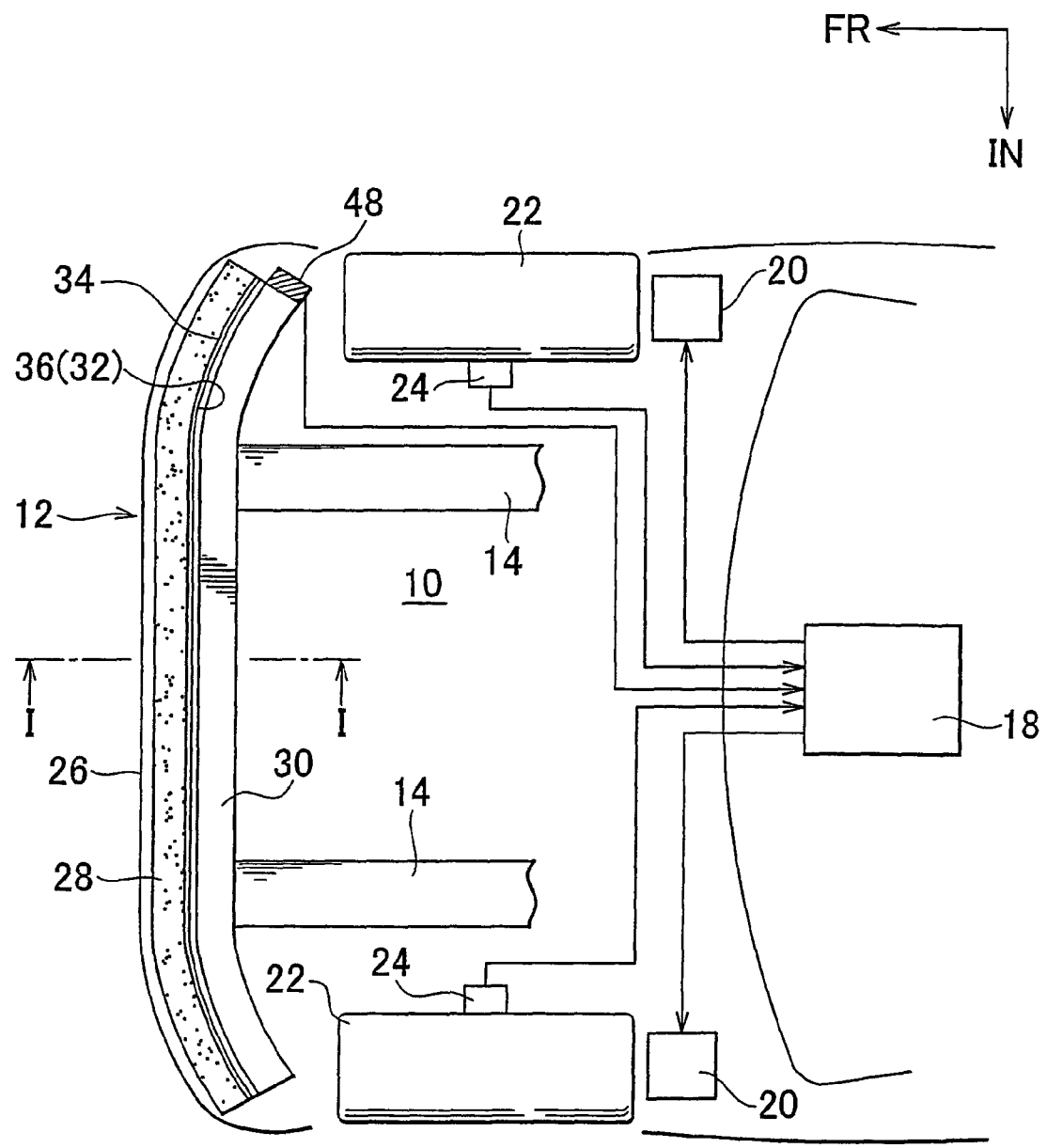
FIG. 3 is a top view depicting the front vehicle-body section including the vehicle bumper structure shown in FIG. 1.

FIG. 3 is a schematic top view of a front vehicle-body section 10; FIG. 2 is an exploded perspective view of a front-bumper 12 in the front vehicle-body section 10; and FIG. 1 is a vertical sectional view (an enlarged sectional view taken along the line 1-1 in FIG. 3) showing major parts of a vehicle bumper structure in accordance with the first embodiment of the present invention.

As shown in FIGS. 1 to 3, a pair of left and right front side members 14 is arranged on both lateral sides of the front vehicle-body section 10 to extend in the longitudinal direction of a vehicle. The front side members 14 are jointed at their front ends to a front-end portion of the front vehicle-body section 10 at both lateral side portions of the front bumper 12, which extends in a vehicle width direction.

Further, an impact detection circuit 48, which will be described later, is arranged at one longitudinal end of the front bumper 12. The impact detection circuit 48 is connected to a central control unit (control means) 18 disposed, e.g., under a center console box (not shown). The central control unit 18 is associated with a pedestrian protection device such as a hood airbag device, an active hood device or the like, and controls the operation thereof. Moreover, vehicle speed sensors 24 are arranged on the inner sides of respective front wheels 22 in the vehicle width direction and are also connected to the central control unit 18.

Meanwhile, the front bumper 12 includes a front bumper cover 26 disposed at the frontmost end of the front vehicle-body section 10 and extending in the vehicle width direction to form a vehicle design surface, a front-bumper absorber 28, as a bumper shock-absorbing member, arranged on a vehicle-rear side of the front bumper cover 26 and extending in the vehicle width direction along the front bumper cover 26, and a front-bumper reinforcement 30, as a bumper reinforcing member, arranged on a vehicle-rear side of the front-bumper absorber 28 and extending in the vehicle width direction.

The front-bumper reinforcement 30 has a vertical cross section of "⊐" shape (i.e., a hollow dual-compartment block shape) when viewed in the vehicle longitudinal direction and is formed of a high rigidity member with a front wall portion 30A, a rear wall portion 30B, a top wall portion 30C, a bottom wall portion 30D and an intermediate wall portion 30E. As mentioned above, the left and right front side members 14 are respectively jointed at their front ends to the rear wall portion 30B of the front-bumper reinforcement 30 either directly or through an energy-absorbing member such as a crush box or the like. The front-bumper reinforcement 30 has longitudinal opposite end portions curved toward a vehicle-rear side at a predetermined angle.

The front-bumper absorber 28 is made of a foam material, e.g., urethane foam, and has a predetermined hardness. In the event of collision with an object 52 (see FIG. 1), the front-bumper absorber 28 compressively deforms in the vehicle longitudinal direction to absorb a predetermined amount of the impact energy. In this embodiment, the front-bumper absorber 28 has a vertical cross section of a generally rectangular shape.

An elongated optical fiber sensor 32 serving as a load-sensing unit is arranged on an upper portion of the front surface of the front wall portion 30A of the front-bumper reinforcement 30. A flat load transfer plate 34, as a load transfer member, is provided between the optical fiber sensor 32 and the front-bumper absorber 28.

Figure 4:
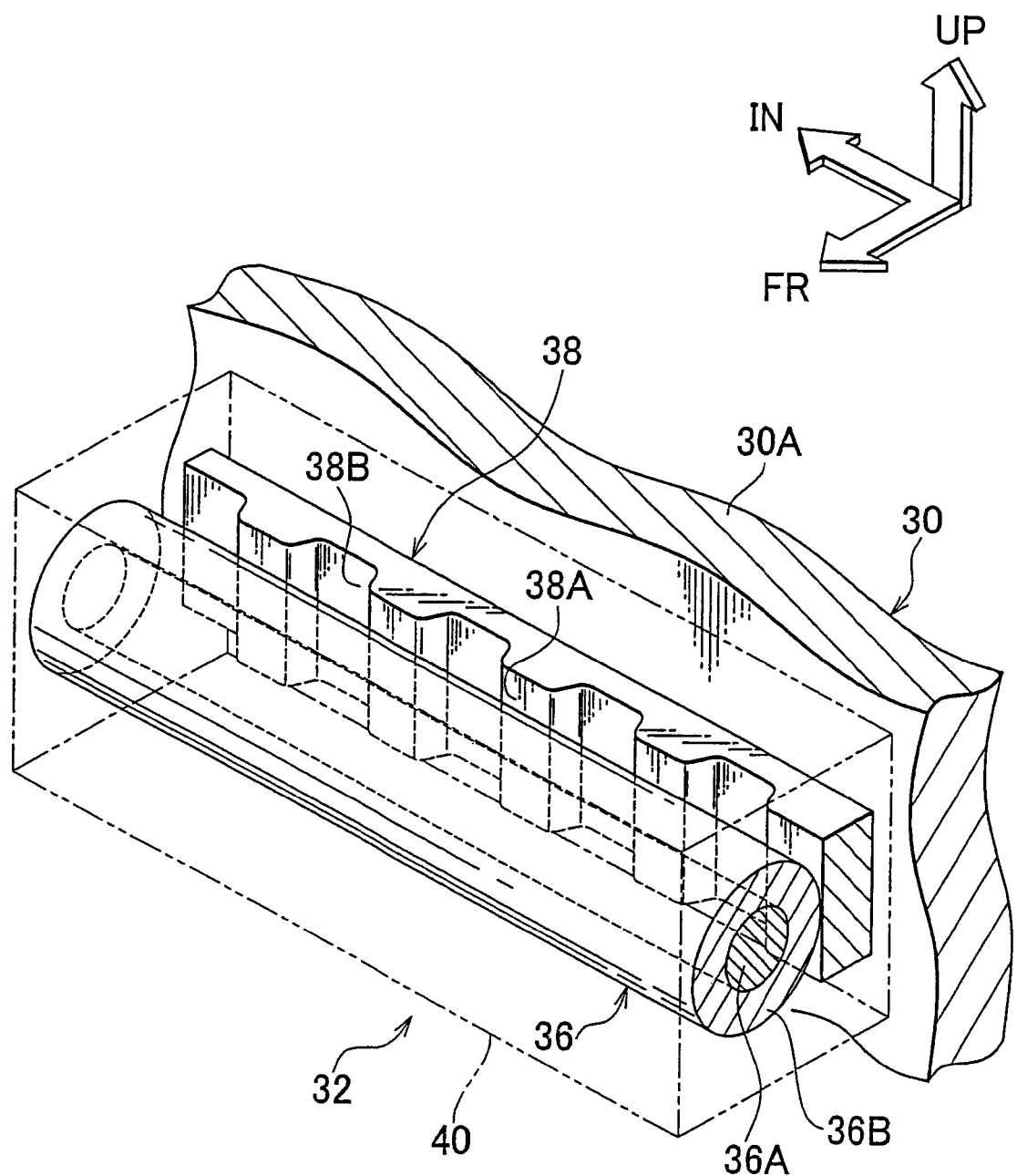
FIG. 4 is a partially cutaway, enlarged perspective view illustrating an optical fiber sensor shown in FIG. 1.

As illustrated in FIG. 4, the optical fiber sensor 32 includes an optical fiber 36 having a core 36A of a circular cross-section and a clad layer 36B coated on the core 36A, an impact detection circuit 48 (see FIGS. 3 and 5) to which a terminal end of the optical fiber 36 is connected, a band-like support member 38 arranged in direct contact with a rear surface of the optical fiber 36, and a resin member 40 of a rectangular cross-section in which the optical fiber 36 and the support member 38 are enclosed by insertion-molding. The rear-end surface of the resin member 40 contacts the front surface of the front wall portion 30A of the front-bumper reinforcement 30. Furthermore, the front-end surface of the resin member 40 is bonded in advance to the rear surface of the load transfer plate 34 by means of, e.g., an adhesive agent, whereby the resin member 40 and the load transfer plate 34 are formed into a sub-assembly. The support member 38 is formed in the shape of a band plate with ridge portions 38A and recess portions 38B alternately arranged. The optical fiber 36 is in contact with the front-end surfaces of the ridge portions 38A.

The optical fiber 36 of the optical fiber sensor 32 is folded to be arranged in two upper and lower extensions running along the front surface of the front wall portion 30A of the front-bumper reinforcement 30. In other words, the optical fiber 36 of the optical fiber sensor 32 is essentially comprised of a single flexible member and is arranged in such a manner that it makes a U-turn at one longitudinal end of the front-bumper reinforcement 30 and then terminates at the other longitudinal end of the front-bumper reinforcement 30.

Figure 5:
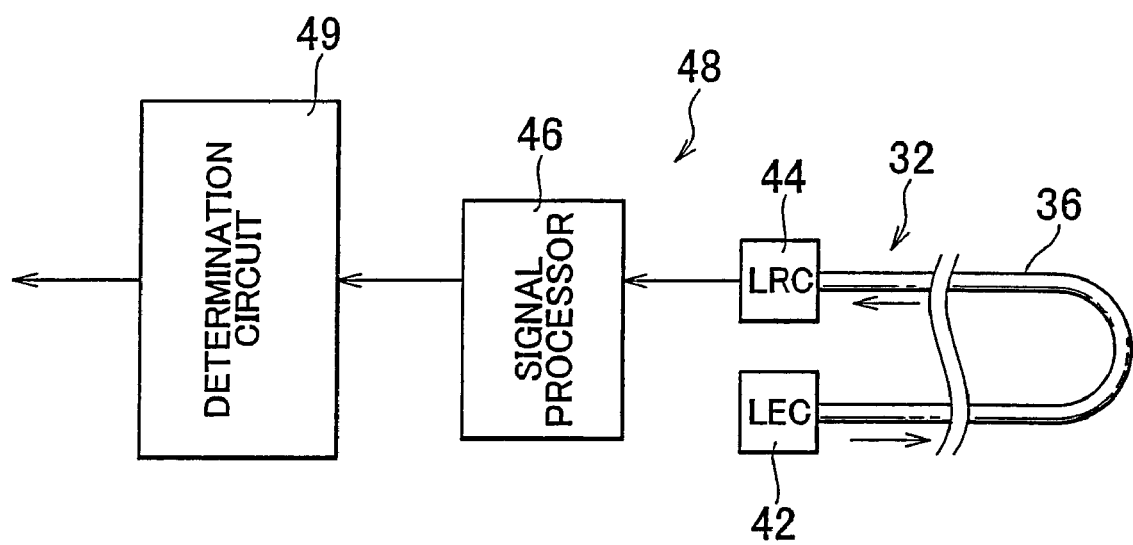
FIG. 5 is a schematic diagram showing an impact detection circuit.

As shown in FIG. 5, both ends of the optical fiber 36 are connected to a light-emitting circuit (LEC) 42 and a light-receiving circuit (LRC) 44 within the impact detection circuit 48, respectively. A light emitted from the light-emitting circuit 42 is transmitted through the optical fiber 36 and then received by the light-receiving circuit 44, after which the light is photoelectrically converted to an electric signal corresponding to the intensity of the light. The electric signal output from the light-receiving circuit 44 is amplified and converted to a digital signal by a signal processor 46, and the digital signal is then output to a determination circuit 49. The determination circuit 49 compares the level of the signal input with a threshold value stored therein to determine the occurrence or absence of a collision with the object 52 (see FIG. 1).

The determination in the determination circuit 49 may be made in further detail to determine, e.g., whether the object 52 is a pedestrian or temporary fencing or cones in a construction site. The result of the determination in the determination circuit 49 is output to the central control unit 18 set forth above. The control operation described above is nothing more than one example and, alternatively, the central control unit 18 instead may determine whether a collision has occurred with the object 52.

In this embodiment, as shown in FIG. 1, the optical fiber sensor 32 has two upper and the lower extension parts arranged in parallel on the upper portion of the front surface of the front wall portion 30A of the front-bumper reinforcement 30. The optical fiber sensor 32 has a vertical width B1 smaller than a vertical width B2 of the front-bumper reinforcement 30, and is offset or off-centered toward the upper portion of the front surface of the front wall portion 30A of the front-bumper reinforcement 30.

Further, the load transfer plate 34 that is positioned in contact with the optical fiber sensor 32 has a vertical width B3 greater than the vertical width B1 of the optical fiber sensor 32, and a lower end portion 34A of the load transfer plate 34 extends below the lower end of the optical fiber sensor 32 (the bottom edge of the lower optical fiber 36) by distance "A". The lower end portion 34A of the load transfer plate 34 is disposed spaced apart from the front surface of the front wall portion 30A of the front-bumper reinforcement 30. In other words, a predetermined gap 50 is left between the lower end portion 34A and the front wall portion 30A. In addition, the front-bumper absorber 28 has a vertical width smaller than the vertical width B2 of the front-bumper reinforcement 30 and equal to the vertical width B3 of the load transfer plate 34.

Next, the operation and effect of the vehicle bumper structure of this embodiment will be described.

If the front bumper 12 collides against the object 52, the impact load F (see FIG. 1) is first applied to the front bumper cover 26 lying on the outermost side of the vehicle. The impact load F applied to the front bumper cover 26 is transferred to and absorbed by the front-bumper absorber 28 arranged inside of the front bumper cover 26 in the vehicle longitudinal direction. The impact load F is then input from the front-bumper absorber 28 through the load transfer plate 34 to the optical fiber sensor 32. Thus, the collision of the front bumper 12 with the object 52 is sensed by the optical fiber sensor 32.

Specifically, if the resin member 40 of the optical fiber sensor 32 is pressed toward the front wall portion 30A of the front-bumper reinforcement 30, i.e., toward the vehicle-rear side, by means of the load transfer plate 34, the resin member 40 is compressively strained in the vehicle longitudinal direction to press the optical fiber 36 toward the vehicle-rear side. Since the ridge portions 38A of the support member 38 are arranged in contact with the vehicle-rear side of the optical fiber 36, the optical fiber 36 is bent at its portions corresponding to the recess portions 38B between the ridge portions 38A, which leads to reduction in light transmission efficiency. The light thus reduced is sensed by the light-receiving circuit 44 and photoelectrically converted to an electric signal. The electric signal is amplified by the signal processor 46 and then input to the determination circuit 49. The determination circuit 49 compares the level of the signal input with a threshold value stored therein to determine whether a collision with the object 52 has occurred. The result of the determination is output to the central control unit 18. Taking into account a signal received from the vehicle speed sensors 24 as well as the above determination result, the central control unit 18 may actuate a pedestrian protection device (such as a hood airbag device, an active hood device or the like).

Meanwhile, in this embodiment, the vertical width B1 of the optical fiber sensor 32 is set to be smaller than the vertical width B2 of the front-bumper reinforcement 30. In other words, the optical fiber sensor 32 has a smaller size in the vehicle height direction than the front-bumper reinforcement 30. Unlike this embodiment, if the lower end portion of the load transfer plate extend below the lower end of the optical fiber sensor 32 and the vertical widths of the load transfer plate and the front-bumper absorber are equal to the vertical width B1 of the optical fiber sensor 32, there exists a possibility that, when the input direction of the impact load is slightly inclined upwardly or downwardly with respect to the vehicle longitudinal direction (e.g., when an impact load F' is input at a downward angle as shown in FIG. 1), the front-bumper absorber 28 may not be compressively deformed as designed in the vehicle longitudinal direction but may topple down in the direction indicated by the arrow P in FIG. 1. In this case, the pressing force applied to the optical fiber sensor 32 in the vehicle rear direction is reduced, thereby making it difficult for the optical fiber sensor 32 to sense the impact load.

In this embodiment, however, because the vertical width B3 of the load transfer plate 34 (and the front-bumper absorber 28) is set to be greater than the vertical width B1 of the optical fiber sensor 32, the front-bumper absorber 28 is difficult to topple down in the direction indicated by the arrow P even if the input direction of the impact load is slightly inclined upwardly or downwardly with respect to the vehicle longitudinal direction. This makes sure that the impact load F' is sufficiently transferred to the optical fiber sensor 32 through the load transfer plate 34. Furthermore, because there is a gap 50 between the load transfer plate 34 and the front surface of the front wall portion 30A of the front-bumper reinforcement 30 (namely, owing to the non-contact arrangement of the load transfer plate 34 and the front wall portion 30A), the load transfer plate 34 is prevented from making contact with the front surface of the front wall portion 30A of the front-bumper reinforcement 30, which would otherwise lead to dispersion and loss of the impact load F or F' to be transferred to the optical fiber sensor 32.

As its apparent from the foregoing, in accordance with the vehicle bumper structure of this embodiment, the impact load applied to the front-bumper absorber 28 can be transferred to the optical fiber sensor 32 with a high accuracy, even in a case where the optical fiber sensor 32 is installed on a part (the upper portion in this embodiment) of the front surface of the front wall portion 30A of the front-bumper reinforcement 30.

The term "high accuracy" as used herein means that the amount of the impact load directly transferred from the front-bumper absorber 28 to the front wall portion 30A of the front-bumper reinforcement 30 is minimized (that is, the loss of load transfer efficiency and the load dispersion are kept small).

Further, in this embodiment, the optical fiber sensor 32 may be offset to the upper portion of the front surface of the front wall portion 30A of the front-bumper reinforcement 30, so that the load transfer plate 34 and the front-bumper absorber 28 are also positioned to correspond to the front surface's upper portion of the front wall portion 30A of the front-bumper reinforcement 30. Moreover, the lower end portion 34A of the load transfer plate 34 may extend below the lower end of the optical fiber sensor 32. Such configurations help to improve the capability to detect a pedestrian. Generally, if the object 52 is a pedestrian, the center of gravity of the pedestrian lies at a high level. For this reason, by the legs of the pedestrian falling down, a load tends to be input to the upper side of the front bumper 12. Accordingly, it can be said that the capability to detect a pedestrian can be improved by the arrangement wherein the optical fiber sensor 32 is offset to the upper portion as described above.

Figure 6:
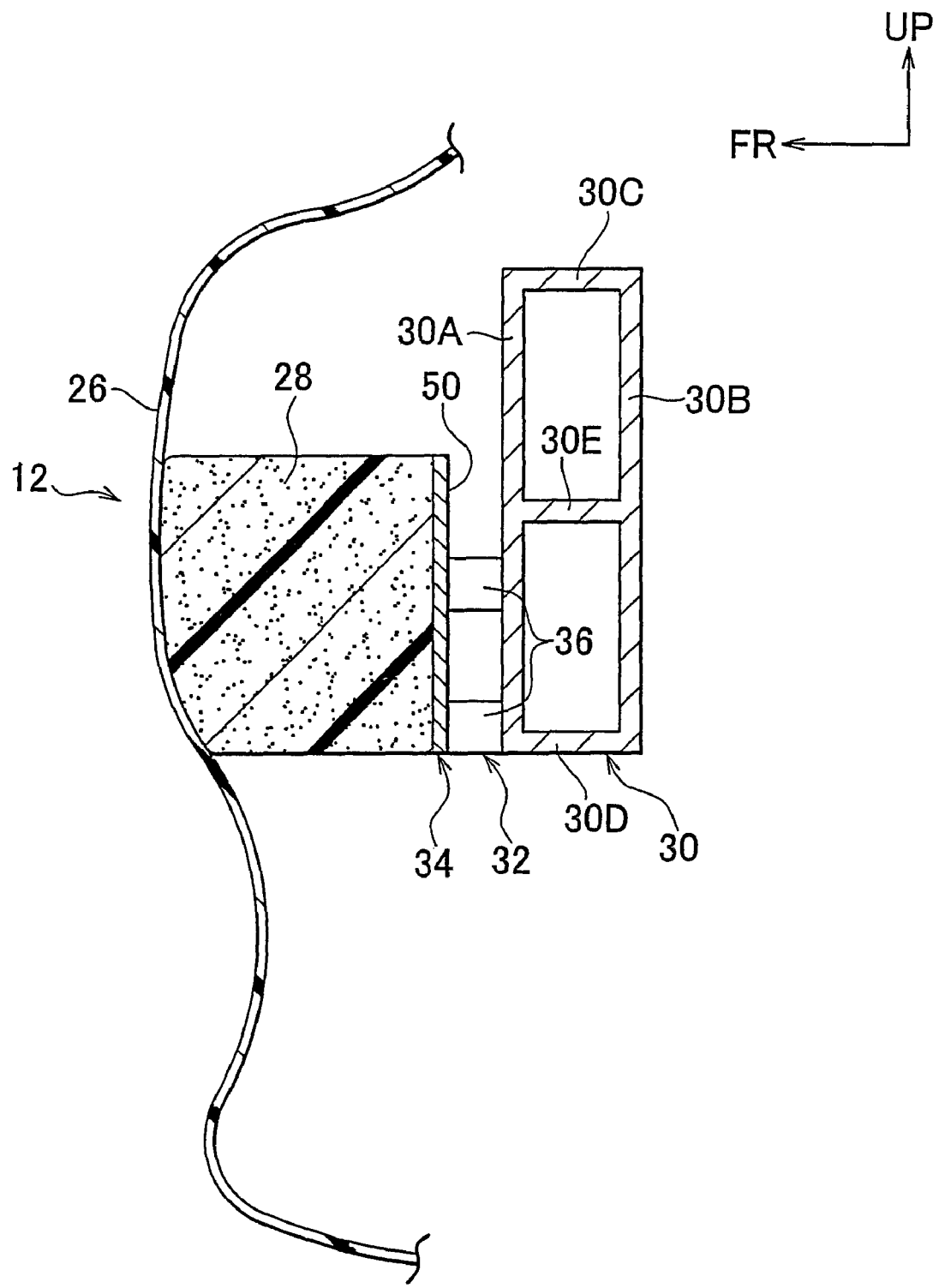
FIG. 6 is a vertical sectional view, corresponding to FIG. 1, showing a modification of the first embodiment wherein an optical fiber sensor is arranged in an offset manner on a lower portion of a front-bumper reinforcement.

In a modified example shown in FIG. 6, the optical fiber sensor 32 may be offset or off-centered to a lower portion of the front surface of the front wall portion 30A of the front-bumper reinforcement 30. Correspondingly, the load transfer plate 34 and the front-bumper absorber 28 may extend above the upper end of the optical fiber sensor 32.

Figure 7:
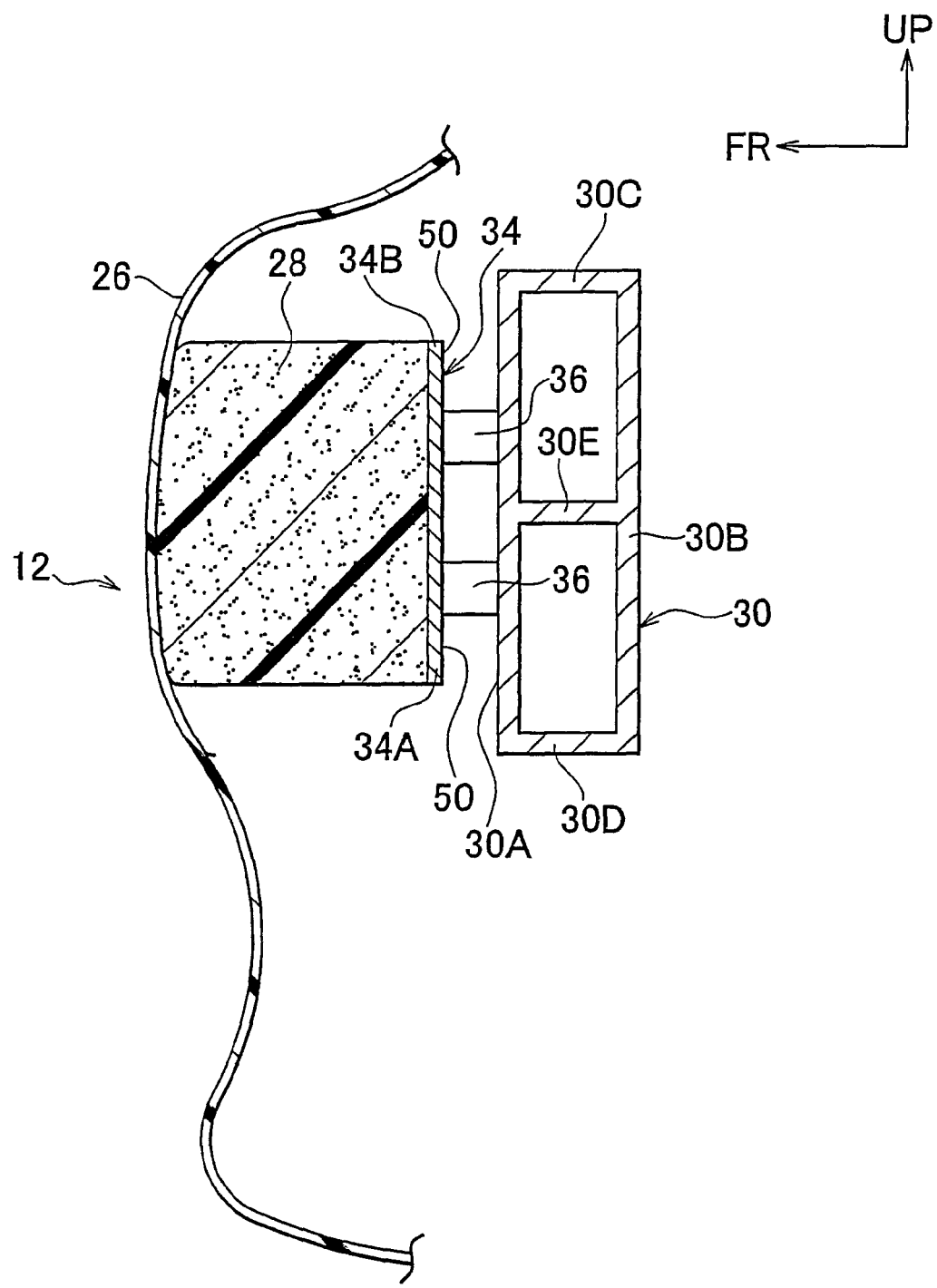
FIG. 7 is a vertical sectional view, corresponding to FIG. 1, showing another modification of the first embodiment wherein an optical fiber sensor is arranged on a center portion of a front-bumper reinforcement.

Meanwhile, in another modified example shown in FIG. 7, the optical fiber sensor 32 is positioned at the central portion of the front surface of the front wall portion 30A of the front-bumper reinforcement 30. Correspondingly, the load transfer plate 34 and the front-bumper absorber 28 may extend above and below the upper and the lower end of the optical fiber sensor 32. Alternatively, if the optical fiber sensor 32 is positioned at the central portion of the front surface of the front wall portion 30A of the front-bumper reinforcement 30, the load transfer plate 34 and the front-bumper absorber 28 may extend above or below the upper or lower end of the optical fiber sensor 32.

In this way, the arrangement of the load transfer plate 34 and the front-bumper absorber 28 can be properly selected depending on the positions of the optical fiber sensor 32 disposed on the front surface of front wall portion 30A of the front-bumper reinforcement 30 as illustrated in FIGS. 1, 6 and 7. This makes it possible to design the vehicle bumper structure to make it correspond to various vehicles in consideration of factors of the front bumper 12 such as a ground clearance.

Hereinafter, a vehicle bumper structure in accordance with a second embodiment of the present invention will be described with reference to FIGS. 8 and 9. The same parts or components as those of the first embodiment are designated by like reference numerals, and descriptions thereon will be omitted.

In the vehicle bumper structure of the second embodiment, a front-bumper absorber 60 includes a main body portion 62 arranged in contact with the load transfer plate 34 and an anti-toppling leg portion 64 extends at a downward inclination angle toward a rear side of the vehicle from a front bottom edge of the main body portion 62. The main body portion 62 is arranged substantially with no clearance between the front surface of the load transfer plate 34 and the front bumper cover 26. The anti-toppling leg portion 64 has a reduced thickness when viewed from the side and a rear end 64A thereof faces the lower end portion of the front surface of the front wall portion 30A of the front-bumper reinforcement 30 in a non-contact relationship with the latter. The rear end 64A may alternatively be in contact with the lower end portion of the front surface of the front wall portion 30A of the front-bumper reinforcement 30, although they are spaced apart from each other in this embodiment. Furthermore, though the lower end portion 34A of the load transfer plate 34 and the rear end 64A of the anti-toppling leg portion 64 are spaced apart from each other in this embodiment, it is possible to change a distance between the lower end portion 34A and the rear end 64A from it shown in FIG. 8.

Figure 8:
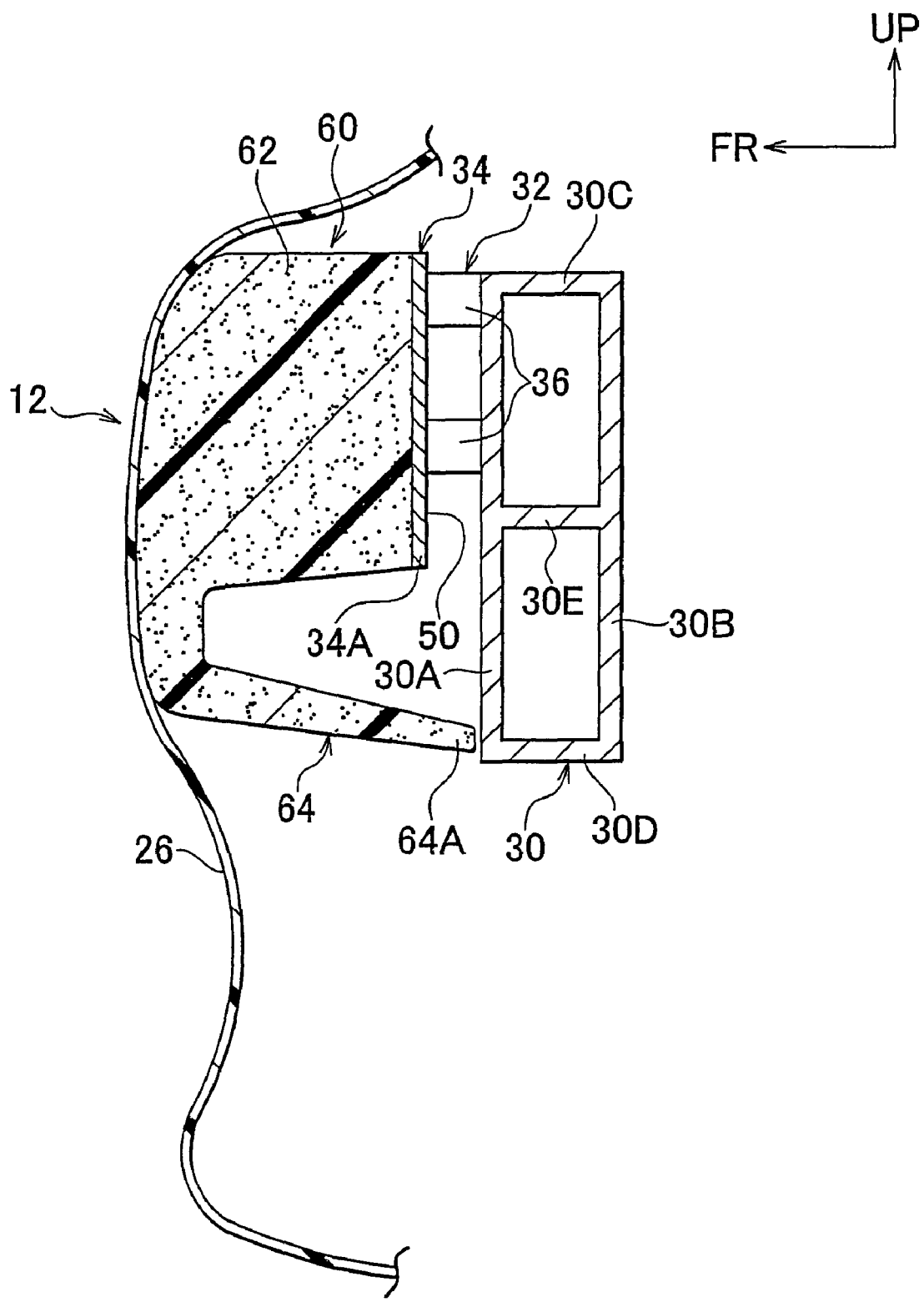
FIG. 8 is an enlarged vertical sectional view, corresponding to FIG. 1, showing major parts of a vehicle bumper structure in accordance with a second embodiment of the present invention.

With such configurations, when a vehicle collides with an object in the state shown in FIG. 8, a load is exerted on the front-bumper absorber 60 through the front bumper cover 26 in a compressing direction (i.e., in the vehicle longitudinal direction). Thus, the front-bumper absorber 60 is pushed toward the vehicle-rear side as a whole and the rear end 64A of the anti-toppling leg portion 64 makes contact with the front surface of the front wall portion 30A of the front-bumper reinforcement 30. When the compression load continues to act on the front-bumper absorber 60, the anti-toppling leg portion 64 is kept pressed against the front surface of the front wall portion 30A of the front-bumper reinforcement 30 if the compression load is smaller than a predetermined value, thereby supporting the main body portion 62 of the front-bumper absorber 60. This keeps the main body portion 62 of the front-bumper absorber 60 from toppling down, whereby the impact load is properly input to the optical fiber sensor 32.

Figure 9:
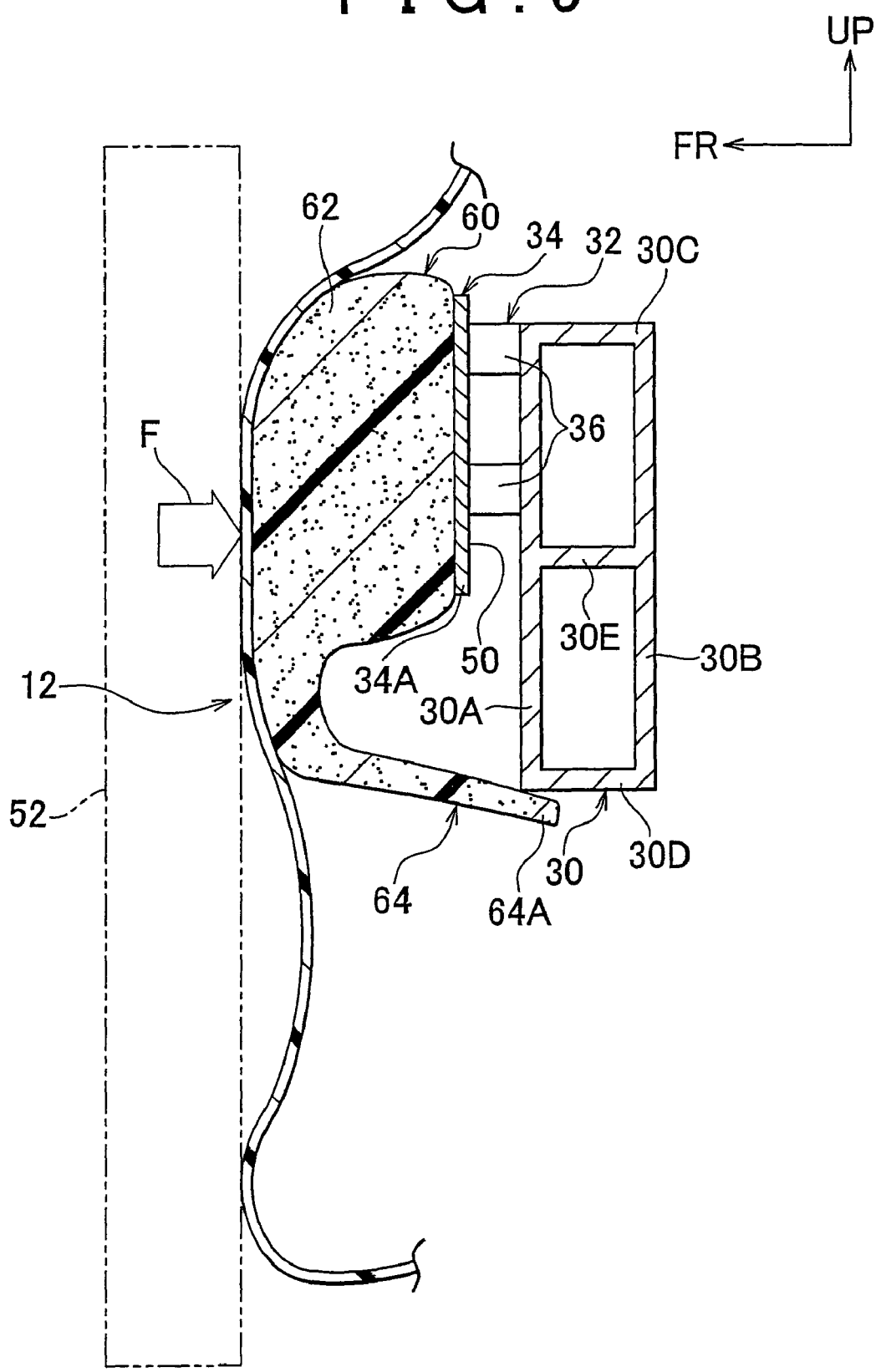
FIG. 9 is a vertical sectional view, corresponding to FIG. 1, illustrating the situation when a vehicle makes a frontal collision with an object from the state shown in FIG. 8.

On the other hand, referring to FIG. 9, if the load input to the front-bumper absorber 60 is equal to or greater than the predetermined value, the anti-toppling leg portion 64 does not support the main body portion 62 of the front-bumper absorber 60. Specifically, because the anti-toppling leg portion 64 extends at a downward angle toward the vehicle-rear side in this embodiment, the rear end 64A of the anti-toppling leg portion 64 slides downward on the front surface of the front wall portion 30A of the front-bumper reinforcement 30 and, eventually, falls down below the bottom end of the front wall portion 30A of the front-bumper reinforcement 30. This minimizes the amount of impact load directly transferred from the anti-toppling leg portion 64 to the front-bumper reinforcement 30, thereby avoiding any load dispersion. In proportion thereto, it becomes possible to suppress any reduction in the amount of impact load input to the optical fiber sensor 32.

As a result, in accordance with this embodiment, it possible to significantly enhance the reliability with which the impact load is transferred from the front-bumper absorber 60 to the optical fiber sensor 32.

Moreover, the addition of the anti-toppling leg portion 64 provides an advantage in that a user of the vehicle can feel an appropriate level of rigidity when touching the front bumper cover 26.

Furthermore, in accordance with this embodiment, the time at which the anti-toppling leg portion 64 ceases its support function can be arbitrarily set by selecting the inclination angle of the anti-toppling leg portion 64. This ensures that the tuning of the support function can be accomplished with ease. The anti-toppling leg portion 64, which extends toward the vehicle-rear side at a predetermined inclination angle, can be formed simultaneously with the foaming of the front-bumper absorber 60, thus requiring no additional manufacturing costs therefor. Consequently, it is possible to tune the support function of the anti-toppling leg portion 64 with ease and in a cost-effective manner.

Figure 10:
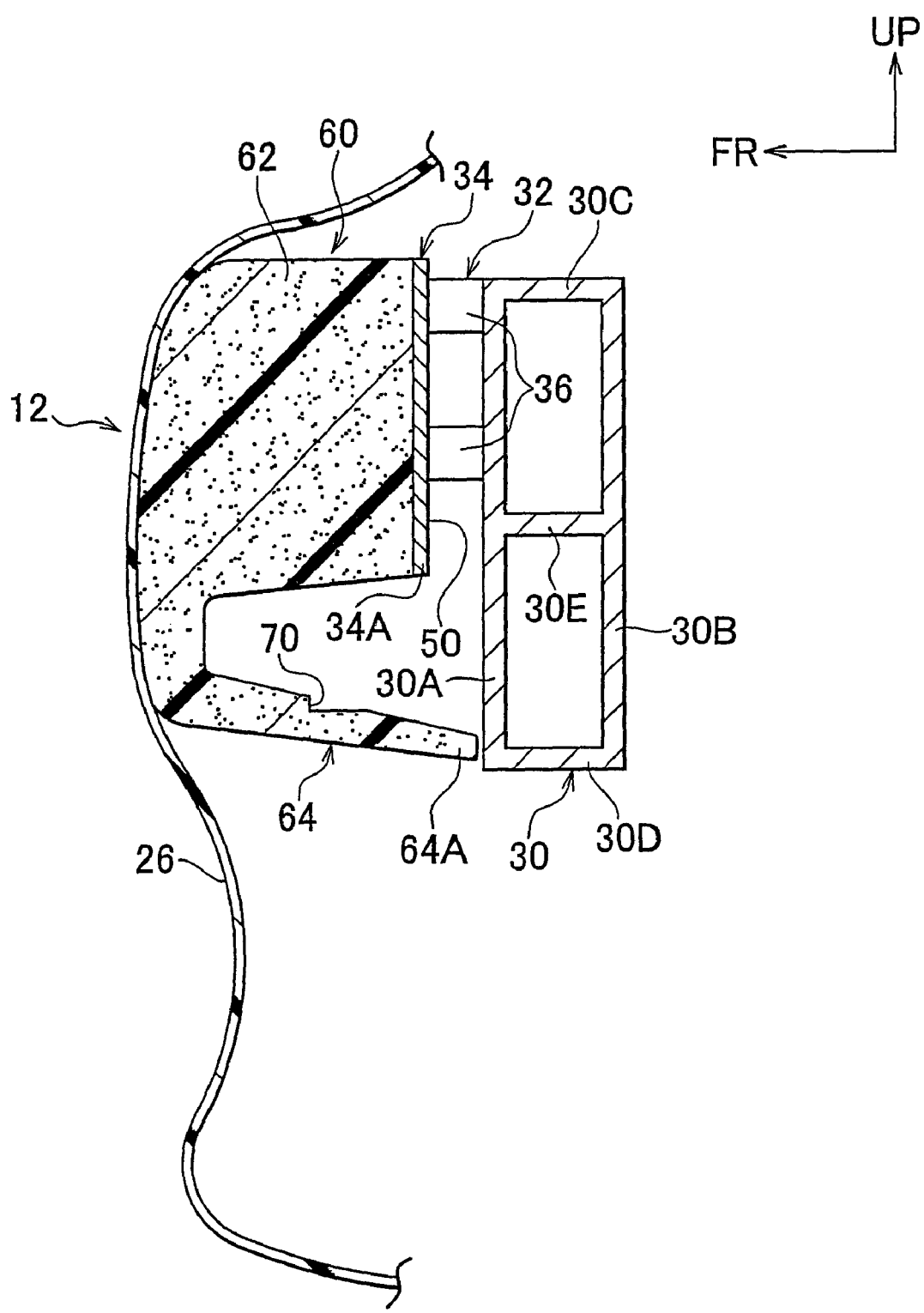
FIG. 10 is a vertical sectional view, corresponding to FIG. 8, showing a modification of the second embodiment wherein an anti-toppling leg has a weakened portion.

In a modified example shown in FIG. 10, a notch portion 70 serving as a weakened portion is formed at around the longitudinal middle region of the anti-toppling leg portion 64. Although the notch portion 70 is formed in the top surface in this modified example, it may be formed in the bottom surface or both the top and the bottom surface of the anti-toppling leg portion 64.

With such configurations, the anti-toppling leg portion 64 buckles or bends at the notch portion 70 if the compression load input to the front-bumper absorber 60 becomes equal to or greater than a predetermined value. In this way, the time at which the anti-toppling leg portion 64 ceases its support function can be arbitrarily set by adjusting the depth (thickness) of the notch portion 70. This ensures that the tuning of the support function can be easily accomplished. The notch portion 70 can be formed simultaneously with the molding of the front-bumper absorber 60, thus requiring no additional manufacturing costs therefor. As a result, it is possible to tune the support function of the anti-toppling leg portion 64 with ease and in a cost-effective manner.

Hereinafter, there will be described the supplementary explanations on the first and the second embodiments.

(1) Although the optical fiber sensor 32 is used as the load-sensing unit in the foregoing embodiments, other sensors of different types (e.g., a pressure sensor) may be employed as appropriate.

(2) Although the optical fiber 36 (inclusive of the resin member 40) of the optical fiber sensor 32 is folded into two upper and lower rows in the foregoing embodiments, the optical fiber 36 may be arranged in three or more rows, one below another. Further, the optical fiber 36 may also be arranged in a single row by passing a return path portion of the optical fiber 36 through the front-bumper reinforcement 30. The description "vertical width of load-sensing unit" in the present invention denotes the vertical width of the resin member 40 enclosing therein the single optical sensor in the case where the optical fiber 36 (inclusive of the resin member 40) of the optical fiber sensor 32 is arranged in a single row on the front surface of the front-bumper reinforcement 30, but it means the vertical width measured from the top end of the uppermost row to the bottom end of the lowermost row of the optical fiber 36 when the optical fiber 36 is arranged in plural rows one below another.

(3) Although the vertical widths of the load transfer plate 34 and the front-bumper absorber 28 are set to be equal to each other in the foregoing embodiments, the vertical width of the front-bumper absorber 28 may be a little smaller than the vertical width B3 of the load transfer plate 34 in the first embodiment, for example.

(4) The anti-toppling leg portion 64 is formed at the lower side of the front-bumper absorber 60 in the second embodiment, because the optical fiber sensor 32 is offset to the upper portion of the front surface of the front-bumper reinforcement 30. If the optical fiber sensor 32 is offset to the lower portion of the front surface of the front-bumper reinforcement 30, the anti-toppling leg portion needs to be formed above the front-bumper absorber.

(5) The term "support function" in the present invention means a function by which the bumper shock-absorbing member is supported and held in place against any toppling down toward the front surface of the front-bumper reinforcement.

While the invention has been shown and described with respect to the preferred embodiments, it will be understood by those skilled in the art that various changes and modifications may be made without departing from the scope of the invention as defined in the following claims.

The invention claimed is:

1. A vehicle bumper structure comprising:
a bumper cover arranged at an outermost side of a vehicle and extending in a vehicle width direction;
a bumper reinforcing member disposed spaced apart from the bumper cover toward the inside of the vehicle, the bumper reinforcing member extending in the vehicle width direction;
a load-sensing unit, arranged on a vehicular outside surface of the bumper reinforcing member, that extends in a lengthwise direction of the bumper reinforcing member, wherein a vertical width of the load-sensing unit is smaller than a vertical width of the bumper reinforcing member;
a bumper shock-absorbing member, arranged between the bumper cover and the bumper reinforcing member and extending in the vehicle width direction, that has a vertical width greater than the vertical width of the load-sensing unit; and
a load transfer member, provided between a load sensing portion of the load-sensing unit and the bumper shock-absorbing member, that transfers a load input from the bumper shock-absorbing member to the load-sensing unit, wherein:
the bumper shock-absorbing member includes a main body portion that contacts the load transfer member and an anti-toppling leg portion of a reduced thickness that extends at a side opposite an offset side of the load-sensing unit in a vehicle height direction toward the vehicular outside surface of the bumper reinforcing member and presses against the vehicular outside surface of the bumper reinforcing member to support the main body portion of the bumper shock-absorbing member when the load is input to the bumper shock-absorbing member;
a lower end portion and/or an upper end portion of the load transfer member is disposed spaced apart from the bumper reinforcement member such that a gap is left between the load transfer member and the vehicular outside surface of the bumper reinforcement member; and
the load transfer member has a vertical width greater than the vertical width of the load-sensing unit, smaller than the vertical width of the bumper reinforcing member, and equal to or greater than the vertical width of the main body of the bumper shock-absorbing member.

2. The vehicle bumper structure according to claim 1, wherein the load-sensing unit is offset to an upper portion of the vehicular outside surface of the bumper reinforcement member, and both the load transfer member and the main body portion extend below a lower end of the load-sensing unit.

3. The vehicle bumper structure according to claim 1, wherein the load-sensing unit is offset to a lower portion of the vehicular outside surface of the bumper reinforcement member, and both the load transfer member and the main body portion extend above an upper end of the load-sensing unit.

4. The vehicle bumper structure according to claim 1, wherein the anti-toppling leg portion is configured to remain pressed against the vehicular outside surface of the bumper reinforcing member to support the main body portion of the bumper shock-absorbing member if the load input in a compressing direction of the anti-toppling leg portion is smaller than a predetermined value, but to lose a support function of supporting the main body portion of the bumper shock-absorbing member if the load input in the compressing direction is equal to or greater than the predetermined value.

5. The vehicle bumper structure according to claim 1, wherein the anti-toppling leg portion has a weakened portion at which the anti-toppling leg portion buckles if the load input in the compressing direction is equal to or greater than a predetermined value.

6. The vehicle bumper structure according to claim 5, wherein the weakened portion is a notch portion formed at around a longitudinal middle region of the anti-toppling leg portion.

7. The vehicle bumper structure according to claim 1, wherein the anti-toppling leg portion is inclined downwardly toward a rear of the vehicle and has a rear end portion that does not contact the vehicular outside surface of the bumper reinforcement member if the load input in a compressing direction is equal to or greater than a predetermined value.

8. A vehicle bumper structure comprising:
a bumper cover arranged at an outermost side of a vehicle and extending in a vehicle width direction;

a bumper reinforcing member disposed spaced apart from the bumper cover toward the inside of the vehicle, the bumper reinforcing member extending in the vehicle width direction;

a load-sensing unit, arranged on a vehicular outside surface of the bumper reinforcing member, that extends in a lengthwise direction of the bumper reinforcing member, wherein a vertical width of the load-sensing unit is smaller than a vertical width of the bumper reinforcing member;

a bumper shock-absorbing member, arranged between the bumper cover and the bumper reinforcing member and extending in the vehicle width direction, that has a vertical width greater than the vertical width of the load-sensing unit; and a load transfer member, provided between a load sensing portion of the load-sensing unit and the bumper shock-absorbing member, that transfers a load input to from the bumper shock-absorbing member to the load-sensing unit, wherein:

a lower end portion and/or an upper end portion of the load transfer member is disposed spaced apart from the bumper reinforcement member such that a gap is left between the load transfer member and the vehicular outside surface of the bumper reinforcement member; and the load transfer member has a vertical width greater than the vertical width of the load-sensing unit, smaller than the vertical width of the bumper reinforcing member, and equal to or greater than the vertical width of the bumper shock-absorbing member.

9. The vehicle bumper structure according to claim 8, wherein the vertical width of the bumper shock-absorbing member is smaller than the vertical width of the bumper reinforcing member.

10. The vehicle bumper structure according to claim 9, wherein the load-sensing unit is offset to an upper portion of the vehicular outside surface of the bumper reinforcement member, and both the load transfer member and the bumper shock-absorbing member extend below a lower end of the load-sensing unit.

11. The vehicle bumper structure according to claim 9, wherein the load-sensing unit is offset to a lower portion of the vehicular outside surface of the bumper reinforcement member, and both the load transfer member and the bumper shock-absorbing member extend above an upper end of the load-sensing unit.

12. The vehicle bumper structure according to claim 9, wherein the load-sensing unit is arranged at a central portion of the vehicular outside surface of the bumper reinforcement member, and both the load transfer member and the bumper shock-absorbing member extend above and/or below at least one of an upper end and a lower end of the load-sensing unit.

13. The vehicle bumper structure according to claim 10, wherein the gap is formed between an extended portion of the load transfer member and the bumper reinforcement member.

14. The vehicle bumper structure according to claim 8, wherein the load-sensing unit is an elongated optical fiber sensor.

15. The vehicle bumper structure according to claim 14, wherein the optical fiber sensor has an upper extension part and a lower extension part arranged in parallel on the vehicular outside surface of the bumper reinforcement member.

16. The vehicle bumper structure according to claim 1, wherein the anti-toppling leg portion supports the main body portion of the bumper shock-absorbing member if the load input in a compressing direction of the anti-toppling leg portion is smaller than a predetermined value, but does not support the main body portion of the bumper shock-absorbing member if the load input in the compressing direction is equal to or greater than the predetermined value.

* * * * *